(12) United States Patent
Naganuma

(10) Patent No.: US 8,394,519 B2
(45) Date of Patent: Mar. 12, 2013

(54) BATTERY SYSTEM

(75) Inventor: Atsuhiro Naganuma, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 1175 days.

(21) Appl. No.: 12/256,732

(22) Filed: Oct. 23, 2008

(65) Prior Publication Data

US 2009/0111007 A1    Apr. 30, 2009

(30) Foreign Application Priority Data

Oct. 25, 2007  (JP) ................................. 2007-278035

(51) Int. Cl.
  *H01M 10/52*    (2006.01)
(52) U.S. Cl. ............ 429/82; 429/83; 429/159; 429/120; 429/91
(58) Field of Classification Search .............. 429/82–83, 429/86, 87, 96–100, 156–159, 120
  See application file for complete search history.

(56) References Cited

U.S. PATENT DOCUMENTS

| | | | |
|---|---|---|---|
| 5,736,836 A | 4/1998 | Hasegawa et al. | |
| 6,713,210 B1 * | 3/2004 | Sato et al. | 429/62 |
| 6,803,144 B2 * | 10/2004 | Hovi et al. | 429/123 |
| 7,301,303 B1 * | 11/2007 | Hulden | 320/105 |
| 2003/0186121 A1 * | 10/2003 | Wang | 429/178 |
| 2004/0043287 A1 * | 3/2004 | Bando et al. | 429/156 |
| 2005/0064280 A1 * | 3/2005 | Watanabe et al. | 429/120 |
| 2005/0130033 A1 * | 6/2005 | Iwamura et al. | 429/159 |
| 2005/0277015 A1 * | 12/2005 | Xu et al. | 429/40 |
| 2007/0141459 A1 * | 6/2007 | Goto et al. | 429/159 |
| 2007/0184337 A1 * | 8/2007 | Nagayama et al. | 429/53 |
| 2007/0218351 A1 * | 9/2007 | Boerner et al. | 429/88 |
| 2008/0233469 A1 * | 9/2008 | Drozdz et al. | 429/61 |

FOREIGN PATENT DOCUMENTS

| | | |
|---|---|---|
| EP | 1091431 A2 | 4/2001 |
| JP | 07-245089 A | 9/1995 |
| JP | 11-317334 A | 11/1999 |
| JP | 11-339747 A | 12/1999 |
| JP | 2002216731 A | 8/2002 |

(Continued)

OTHER PUBLICATIONS

European Search Report dated Feb. 5, 2009, issued in corresponding European Patent Application No. 08167471.5.

(Continued)

*Primary Examiner* — Joseph Del Sole
*Assistant Examiner* — Nahida Sultana
(74) *Attorney, Agent, or Firm* — Westerman, Hattori, Daniels & Adrian, LLP

(57) ABSTRACT

A battery system includes a plurality of electric rechargeable cells which are stacked in a row and conductive members which electrically connect the electric rechargeable cells together. The electric rechargeable cells each has a gas exhaust port, and a positive electrode terminal and a negative electrode terminal which are disposed in such a manner as to hold the gas exhaust port therebetween. The battery system includes a gas exhaust member connected to the gas exhaust ports, a partition holding member which establishes partitions between the gas exhaust member and the positive electrode terminals and the negative electrode terminals in such a manner as to cover them and on which the conductive members are provided, and a voltage control circuit which is attached to an outer surface side of the partition holding member in a position which confronts the gas exhaust member and controls voltages of the electric rechargeable cells.

10 Claims, 16 Drawing Sheets

FOREIGN PATENT DOCUMENTS

| | | |
|---|---|---|
| JP | 2002-31330 A | 10/2002 |
| JP | 2003-100273 A | 4/2003 |
| JP | 2003-187772 A | 7/2003 |
| JP | 2006-278334 A | 10/2006 |

OTHER PUBLICATIONS

Japanese Office Action dated Jul. 24, 20123, issued in corresponding Japanese Patent Application No. 2007-278035 (4 pages).

* cited by examiner ing members 608 is increased.

BATTERY SYSTEM

TECHNICAL FIELD

The present disclosure relates to a battery system which is mounted on a fuel cell vehicle, an electric vehicle, a plug-in hybrid vehicle, and a hybrid vehicle.

RELATED ART

There is proposed, as an example of a related-art battery system, a battery system in which gas exhaust members on which fit-in type connecting portions and receiving type connecting portions are formed are provided on a plurality of lithium electric rechargeable cells. In the battery system, the plurality of electric rechargeable cells are connected to each other in such a manner that the fit-in type connecting portion of one gas exhaust member and the receiving type connecting portion of the adjacent gas exhaust member are connected to each other (for example, refer to Patent Document No. 1).
[Patent Document No. 1] Japanese Patent Unexamined Application Publication No. 2002-216731

Normally, when electric rechargeable cells for a lithium ion secondary battery are mounted on a vehicle, a voltage control circuit (a cell controller) is necessary from the viewpoint of controlling the battery and preserving safety which monitors respective charged capacities of the electric rechargeable cells and controls charge and discharge of the electric rechargeable cells so as to make the charged capacities thereof uniform. In addition, there may emerge a case where gas exhaust ports are provided on the electric rechargeable cells for exhausting or expelling gases generated inside the electric rechargeable cells to the outside thereof.

In addition, as to shapes of electric rechargeable cells, there are electric rechargeable cells of cylindrical and angular shapes. As a battery system in which cylindrical electric rechargeable cells are used, a battery system 500 shown in FIG. 15 is considered. In order that a positive electrode terminal, a negative electrode terminal and an exhaust port are made to coexist in one location, a positive electrode terminal 503, a negative electrode terminal 504 and a gas exhaust port 505 are disposed altogether on an end face 502 of a cylindrical portion of an electric rechargeable cell 501. Conductive members 506 are connected to the respective terminals 503, 504 and a gas exhaust member 507 is connected to the gas exhaust port 505.

In the battery system 500 configured as described above, however, since an area of the end face 502 of the electric rechargeable cell 501 is limited, it has been difficult that a conductive member 506 and a gas exhaust member 507 are attached to each of the plurality of electric rechargeable cells 501.

In addition, as a battery system in which similar cylindrical electric rechargeable cells are used, a battery system 600 shown in FIG. 16 is considered. A positive electrode terminal 605 and a negative electrode terminal 606 are disposed, respectively, on end faces 603, 604 of a cylindrical portion of each of electric rechargeable cells 602 which are accommodated in a case 601. Conductive members 607 are held by partition holding members 608, and a gas exhaust member 609 is formed on the case 601.

In the battery system 600 configured as described above, however, it has been difficult that the gas exhaust member 609 formed on the case 601 is made to connect to respective gas exhaust ports 610 of the electric rechargeable cells 602 and there has been a possibility that the number of partition holding members 608 is increased.

In addition, as a battery system in which angular electric rechargeable cells are used, a battery system 700 shown in FIG. 17 is considered. A plurality of electric rechargeable cells 701 are disposed, a positive electrode terminal 702 and a negative electrode terminal 703 of adjacent electric rechargeable cells 701 are connected by a conductive member 704, a gas exhaust member 706 is formed on a case 705, and a voltage control circuit 707 is disposed on an outside of the case 705.

In the battery system 700 configured as described above, however, since the case 705 and the voltage control circuit 707 are not configured integrally, the assembling properties are not good, and there has been a possibility that the battery system 700 is made large in size. In addition, since the voltage control circuit 707 is loaded above the terminals 702, 703, there has been a possibility that a problem such as short circuit occurs.

Furthermore, it has been difficult that a conductive member is fastened to each terminal of an electric rechargeable cell due to a recent tendency of an electric rechargeable cell becoming smaller in size and thinner in thickness.

It has been difficult from the viewpoint of layout to realize altogether the electric connection between the electric rechargeable cells and the voltage control circuit, connection between the gas exhaust ports and the gas exhaust member and fastening of the respective terminals of the electric rechargeable cells to the conductive members in the ways described above. In case these are really attempted to be realized altogether, it will be easy to seen that the resulting construction becomes complicated, and this has been the case with such an attempt. In addition, when the voltage control circuit is disposed outside the case, the assembling properties are not good, and there has been a possibility that the battery system is enlarged in size.

SUMMARY

Exemplary embodiments of the present invention provide a battery system which is simple in construction but is able to integrate electric rechargeable cells, respective terminals of the electric rechargeable cells, conductive members, a voltage control circuit and a gas exhaust member into a compact unit and which can increase the assembling properties of the battery system and realize the miniaturization of the battery system.

According to a first aspect of the invention, there is provided a battery system including a plurality of electric rechargeable cells (for example, electric rechargeable cells 20 of an embodiment) which are stacked in a row and conductive members (for example, conductive members 11 of the embodiment) which electrically connect the electric rechargeable cells together, the electric rechargeable cells each having a gas exhaust port (for example, a gas exhaust port 24 of the embodiment), as well as a positive electrode terminal (for example, a positive electrode terminal 22 of the embodiment) and a negative electrode terminal (for example, a negative electrode terminal 23) which are disposed in such a manner as to hold the gas exhaust port therebetween, the battery system including a gas exhaust member (for example, a gas exhaust member 80 of the embodiment) connected to the gas exhaust ports, and a voltage control circuit (for example, a voltage control circuit 70 of the embodiment) provided in a position which confronts the gas exhaust member and lies between the positive electrode terminals and the negative electrode terminals and connected to the positive electrode terminals and the negative electrode terminals of the electric rechargeable cells for controlling voltages of the electric rechargeable cells. Herein, the term "electric rechargeable cell" used in the specification includes a battery, capacitor, etc.

According to a second aspect of the invention, there is provided a battery system including a plurality of electric rechargeable cells which are stacked in a row and conductive members which electrically connect the electric rechargeable cells together, the electric rechargeable cells each having a gas exhaust port, and a positive electrode terminal and a negative electrode terminal which are disposed in such a manner as to hold the gas exhaust port therebetween, the battery system including a gas exhaust member connected to the gas exhaust ports, a partition holding member 40 (for example, a partition holding member 40 of the embodiment) which establishes partitions between the gas exhaust member and the positive electrode terminals and the negative electrode terminals in such a manner as to cover the gas exhaust member and the positive electrode terminals and the negative electrode terminals and on which the conductive members are provided, and a voltage control circuit attached to an outer surface side of the partition holding member in a position which confronts the gas exhaust member for controlling voltages of the electric rechargeable cells.

According to a third aspect of the invention, there is provided a battery system as set forth in the first or second aspect of the invention, wherein the positive electrode terminals and the negative electrode terminals are each a plate-shaped member and are disposed in such a manner that plate surfaces thereof confront each other.

According to a fourth aspect of the invention, there is provided a battery system as set forth in any of the first to third aspects of the invention, wherein a first penetrating hole (for example, a first penetrating hole 25 of the embodiment) is provided in each of the positive electrode terminals and each of the negative electrode terminals and a second penetrating hole (for example, a second penetrating hole 11a of the embodiment) is provided in each end portion of each of the conductive members, and wherein the positive electrode terminal, the negative electrode terminal and the conductive member are fixed together by fastening members (for example, fastening bolts 13 of the embodiment) which are inserted into the first penetrating holes and the second penetrating holes.

According to a fifth aspect of the invention, there is provided a battery system as set forth in the fourth aspect of the invention, wherein the first penetrating hole is formed into an elongated hole shape, and the adjacent conductive members are arranged in a zigzag fashion in a direction of the row of electric rechargeable cells so as to be connected to the positive electrode terminals and the negative electrode terminals.

According to a sixth aspect of the invention, there is provided a battery system as set forth in any of the first to fifth aspects of the invention, wherein a cell holder (for example, a cell holder 30 of the embodiment) is provided for holding the electric rechargeable cells, and wherein projecting portions (for example, projecting portions 33 of the embodiment) are provided on the cell holder for defining gaps between the electric rechargeable cells and the cell holder along which cooling air is caused to flow.

According to a seventh aspect of the invention, there is provided a battery system as set forth in any of the fourth to sixth aspects of the invention, wherein a threaded fastener member (for example, a nut member 47 of the embodiment) is provided which is conductive and into which the fastening member is screwed, and wherein the threaded fastener member and the voltage control circuit are electrically connected.

According to an eighth aspect of the invention, there is provided a battery system as set forth in any of the first to seventh aspects of the invention, wherein the gas exhaust ports are disposed in a row in a direction in which the electric rechargeable cells are stacked, and wherein the gas exhaust member has a plurality of exhaust pipes (for example, exhaust pipes 82 of the embodiment) and gases from the gas exhaust ports are divided so as to flow into the plurality of exhaust pipes.

According to a ninth aspect of the invention, there is provided a battery system as set forth in any of the first to seventh aspects of the invention, wherein the gas exhaust ports are disposed in a zigzag fashion in a direction in which the electric rechargeable cells are stacked, and wherein the gas exhaust member has a single exhaust pipe (for example, an exhaust pipe 92 of the embodiment) and gases from the gas exhaust ports are collected so as to flow into the single exhaust pipe.

According to a tenth aspect of the invention, there is provided a battery system as set forth in any of the first to seventh aspects of the invention, wherein the gas exhaust ports are disposed in a plurality of rows in a direction in which the electric rechargeable cells are stacked, and wherein the gas exhaust member has exhaust pipes (for example, exhaust pipes 102 of the embodiment) which are disposed correspondingly to the respective rows of exhaust ports and gases from the gas exhaust ports disposed in the plurality of rows are collected into the exhaust pipes.

According to an eleventh aspect of the invention, there is provided a battery system as set forth in any of the sixth to tenth aspects of the invention, including end face plates (for example, end face plates 50 of the embodiment) which are attached, respectively, to end faces of the cell holder and the partition holding member and a through-hole fastening member (for example, a through-hole fastening member 60 of the embodiment) which extends through the cell holder, the partition holding member, and the end face plates so as to fasten together the cell holder, the partition holding member and the end face plates.

According to the battery system set forth in the first aspect of the invention, the positive electrode terminals and the negative electrode terminals of the electric rechargeable cells and the voltage control circuit can be connected to each other over a short distance, thereby making it possible to make the battery system smaller in size.

According to the battery system set forth in the second aspect of the invention, the space between the positive electrode terminals and the negative electrode terminals is used effectively and the partition holding member has the layered construction. Therefore, the electric rechargeable cells, the respective terminals of the electric rechargeable cells, the conductive members, the voltage control circuit and the gas exhaust member can be integrated into a compact unit. In addition, since the voltage control circuit is incorporated into the battery system, the assembling properties of the system can be increased, thereby making it possible to realize the miniaturization of the battery system.

According to the battery system set forth in the third aspect of the invention, torque received by the electric rechargeable cells when the conductive member is connected to the electric rechargeable cells in such a manner as to expand between the adjacent electric rechargeable cells can be made to be borne by the threaded fastener members of the partition holding member when compared with a battery system in which terminals of electric rechargeable cells each have a round shaft shape. Therefore, the electric rechargeable cell can be made compact in terms of strength, thereby making it possible to realize the miniaturization of the battery system.

According to the battery system set forth in the fourth aspect of the invention, the conductive member can easily be fastened to the positive electrode terminal and the negative electrode terminal.

According to the battery system set forth in the fifth aspect of the invention, by arranging the adjacent conductive members in the zigzag fashion in the direction in which the electric rechargeable cells are stacked, a bolt larger in size is allowed to be used, thereby making it possible to increase the assembling properties.

According to the battery system set forth in the sixth aspect of the invention, the electric rechargeable cells can be cooled with good efficiency.

According the battery system set forth in the seventh aspect of the invention, the positive electrode terminals and the negative electrode terminals of the electric rechargeable cells can be connected to the voltage control circuit over a short distance via the threaded fastener members. This can serve to reduce the possibility that a problem such as short circuit is caused.

According to the battery system set forth in the eighth aspect of the invention, even in the event that gases are produced within the electric rechargeable cells, the pressure under which the gases are produced can be dispersed through the exhaust pipes into which the gases so produced are designed to be divided to flow so that the gases can be exhausted or expelled with good efficiency.

According to the battery system set forth in the ninth aspect of the invention, even in the event that gases are produced within the electric rechargeable cells, the pressure under which the gases are produced can be dispersed through the exhaust pipe into which the gases so produced are designed to be collected to flow so that the gases can be exhausted or expelled with good efficiency.

According to the battery system set forth in the tenth aspect of the invention, even in the event that gases are produced within the electric rechargeable cells, the pressure under which the gases are produced can be dispersed through the exhaust pipes which are disposed correspondingly to the rows of electric rechargeable cells so that the gases can be exhausted or expelled with good efficiency.

According to the battery system set forth in the eleventh aspect of the invention, the strong and rigid housing construction can be obtained as the whole of the battery system, thereby making it possible to increase the durability of the battery system.

Other features and advantages may be apparent from the following detailed description, the accompanying drawings and the claims.

DETAILED DESCRIPTION

Figure 1:
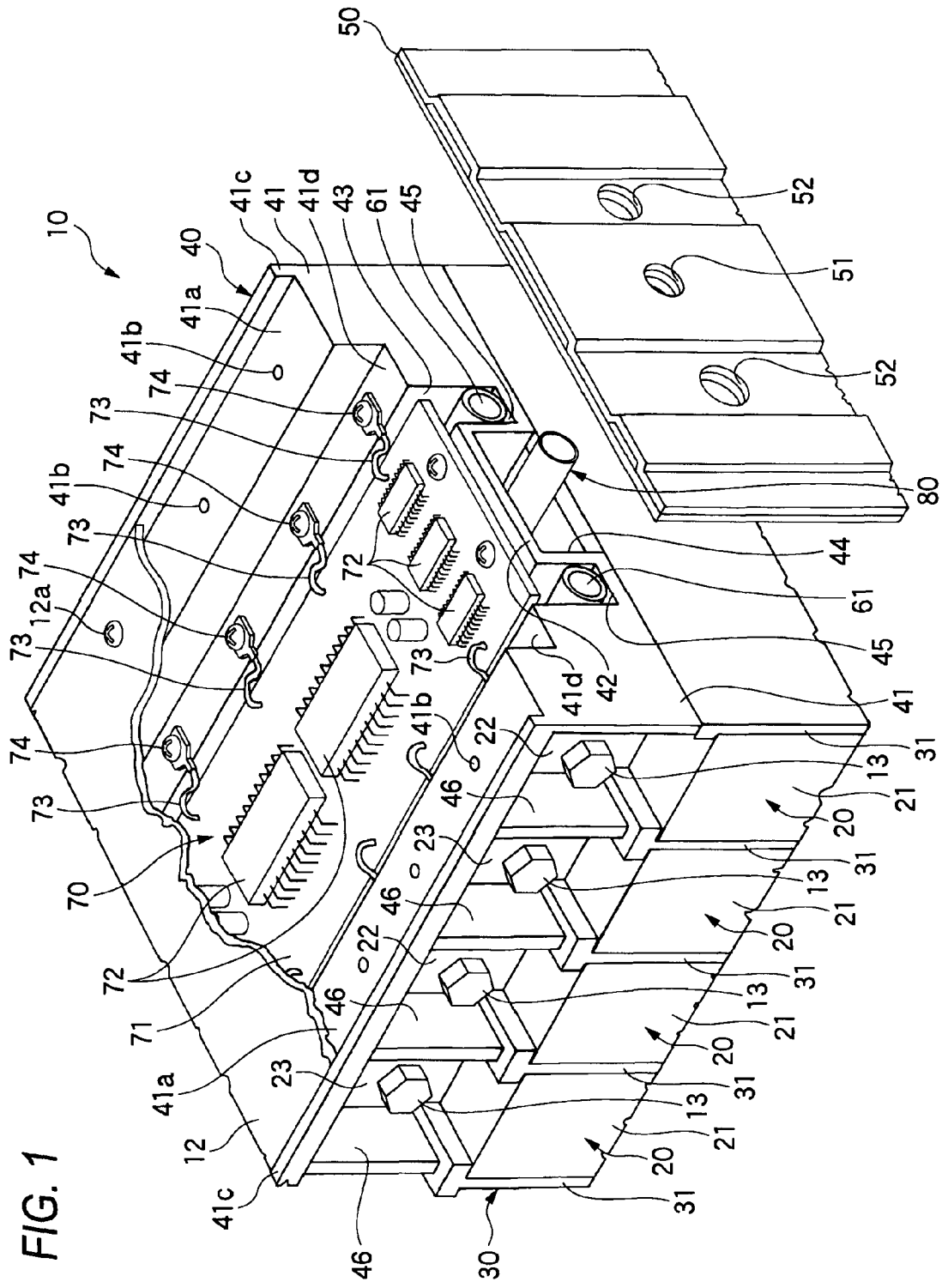
FIG. 1 is a partially cutaway, exploded perspective view which illustrates one embodiment of a battery system according to the invention.

Hereinafter, an embodiment of a battery system according to the invention will be described in detail based on the accompanying drawings. Note that the drawings are to be viewed in a direction in which reference numerals are oriented therein.

Figure 2:
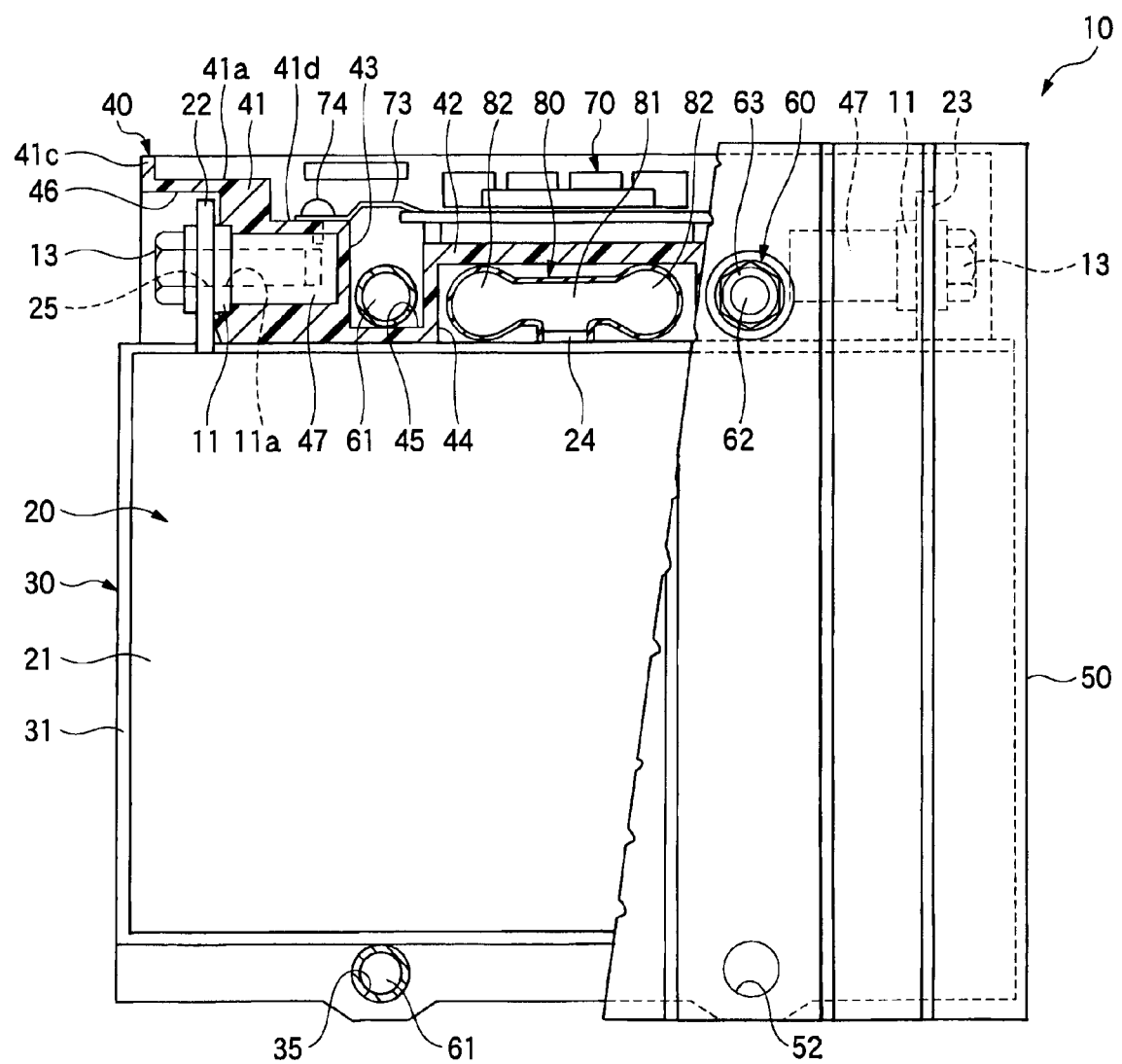
FIG. 2 is a partially cutaway front view of the battery system shown in FIG. 1.
Figure 3:
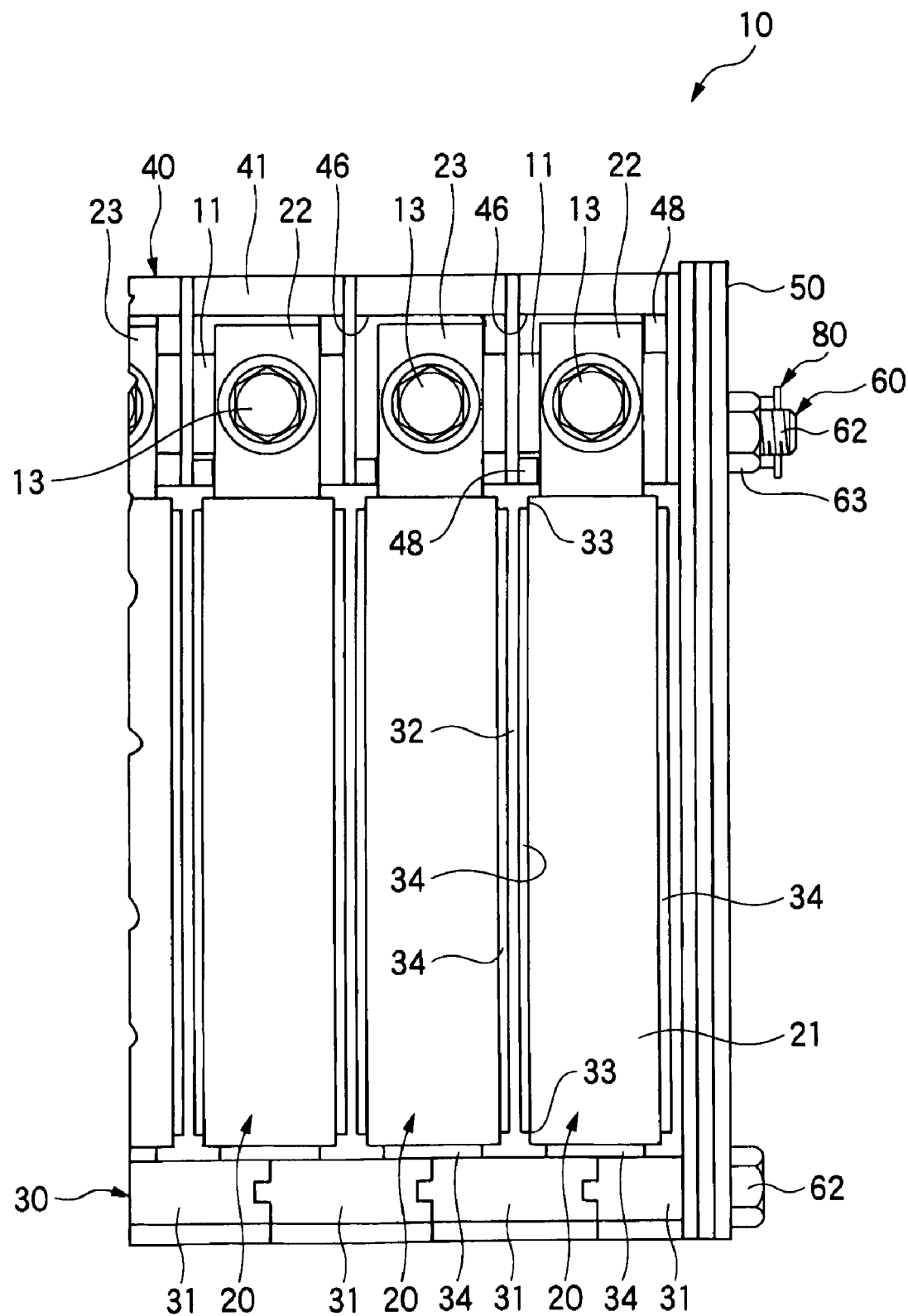
FIG. 3 is a partially cutaway side view of the battery system shown in FIG. 1.
Figure 4:
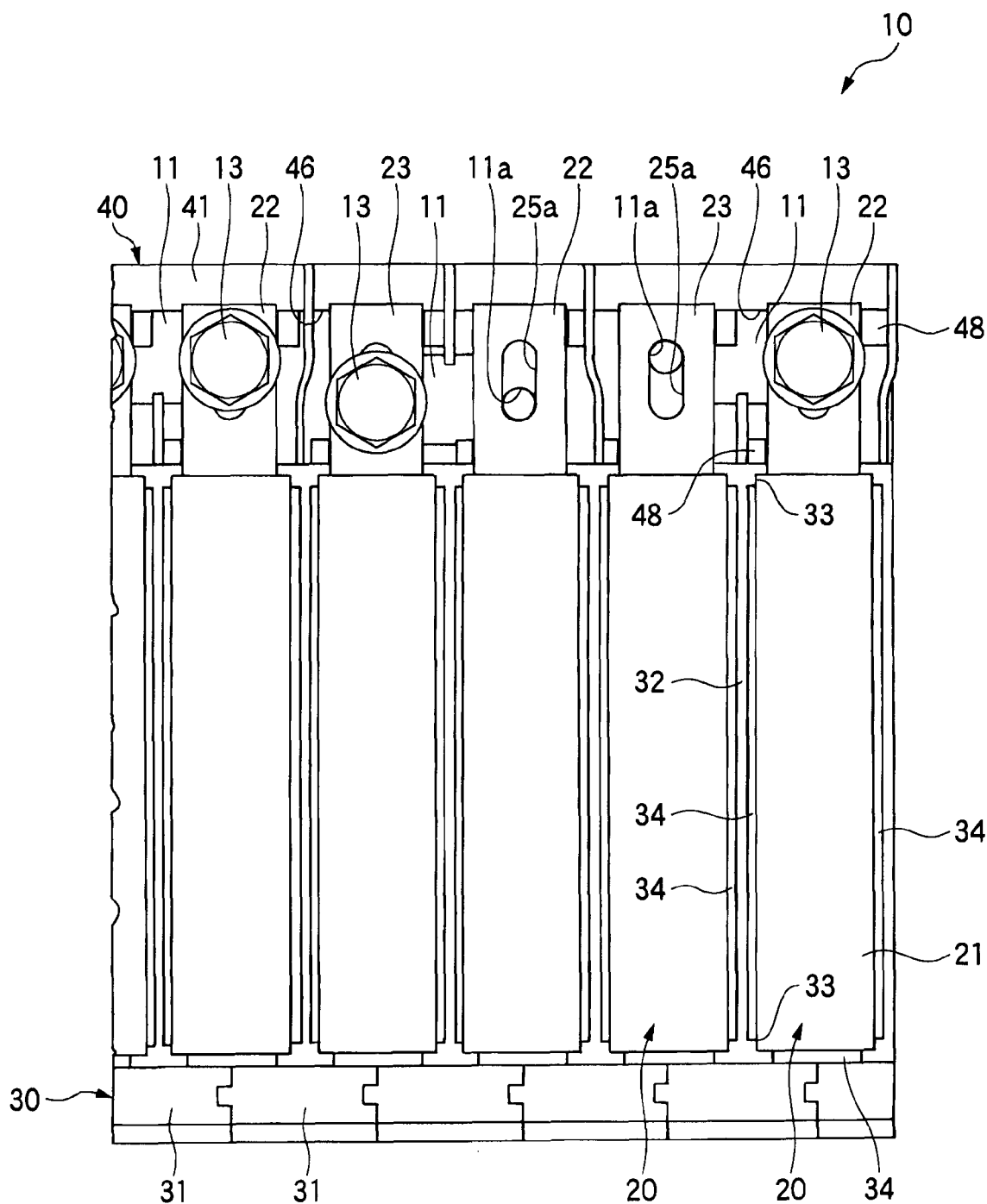
FIG. 4 is a partially cutaway side view which illustrates modified examples of terminals of the electric rechargeable cells.
Figure 5:
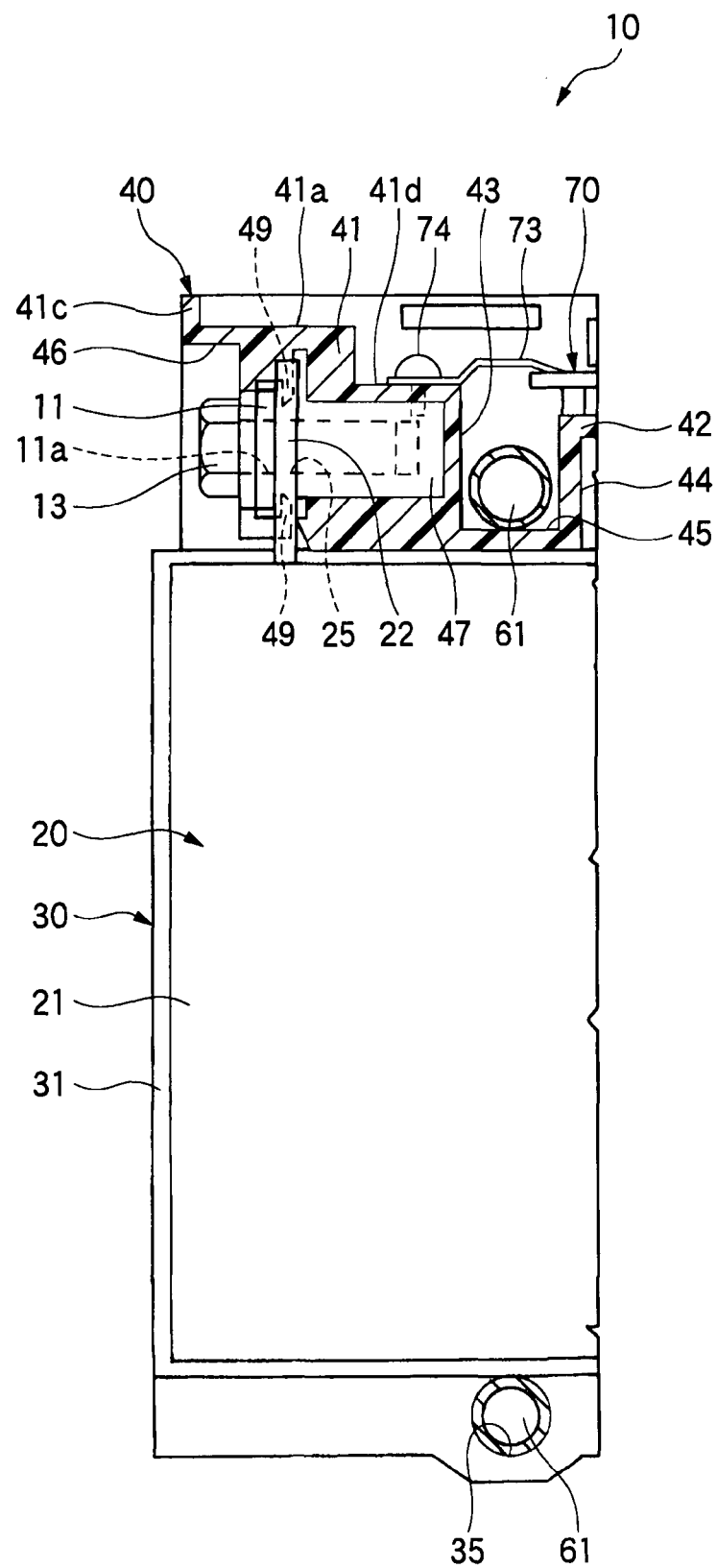
FIG. 5 is a partially cutaway front view which illustrates a modified example of an assembling construction of a conductive member and a partition holding member.
Figure 6:
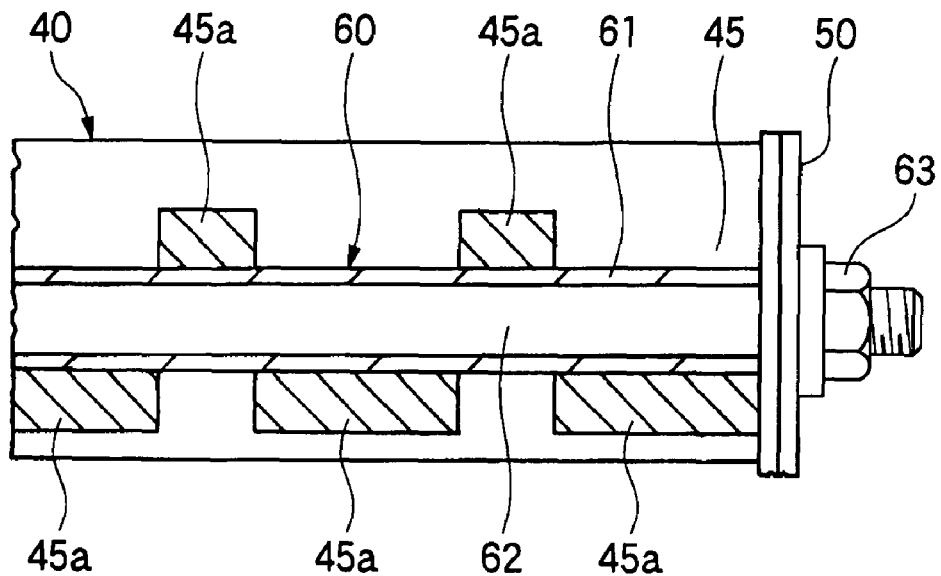
FIG. 6 is a sectional view of a main part which illustrates an assembling construction of a through-hole fastening member.
Figure 7:
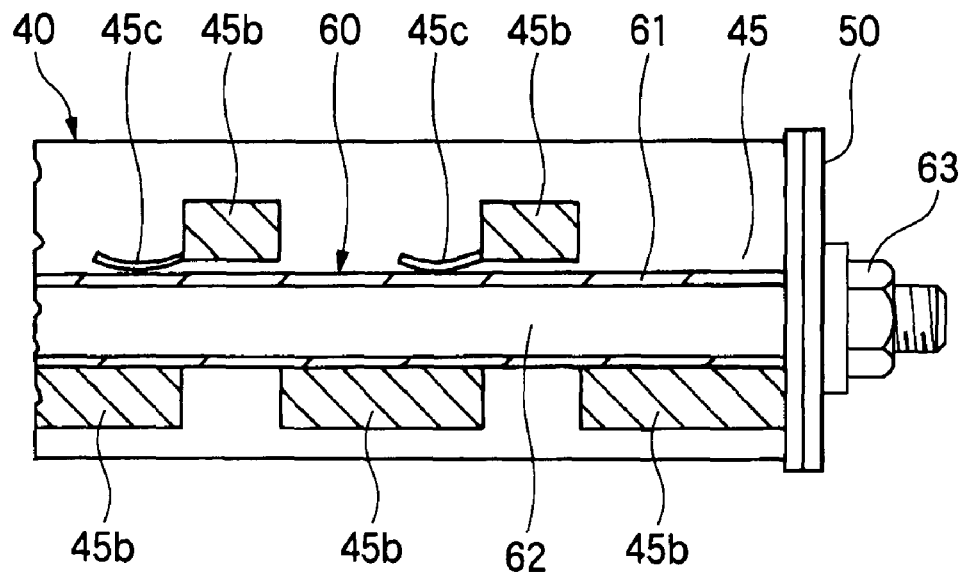
FIG. 7 is a sectional view which illustrates a modified example to the assembling construction of the through-hole fastening member shown in FIG. 6.
Figure 8:
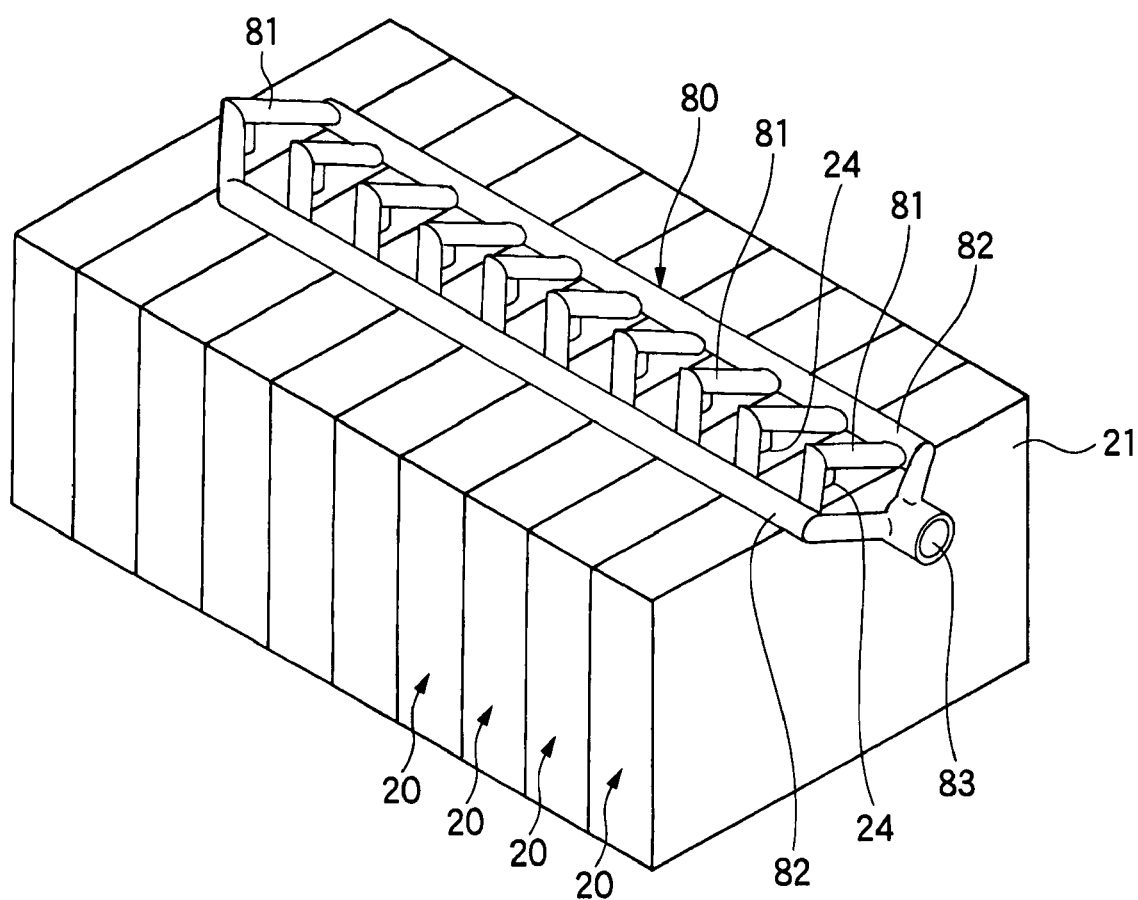
FIG. 8 is a schematic perspective view of electric rechargeable cells and a gas exhaust member shown in FIG. 2.
Figure 9:
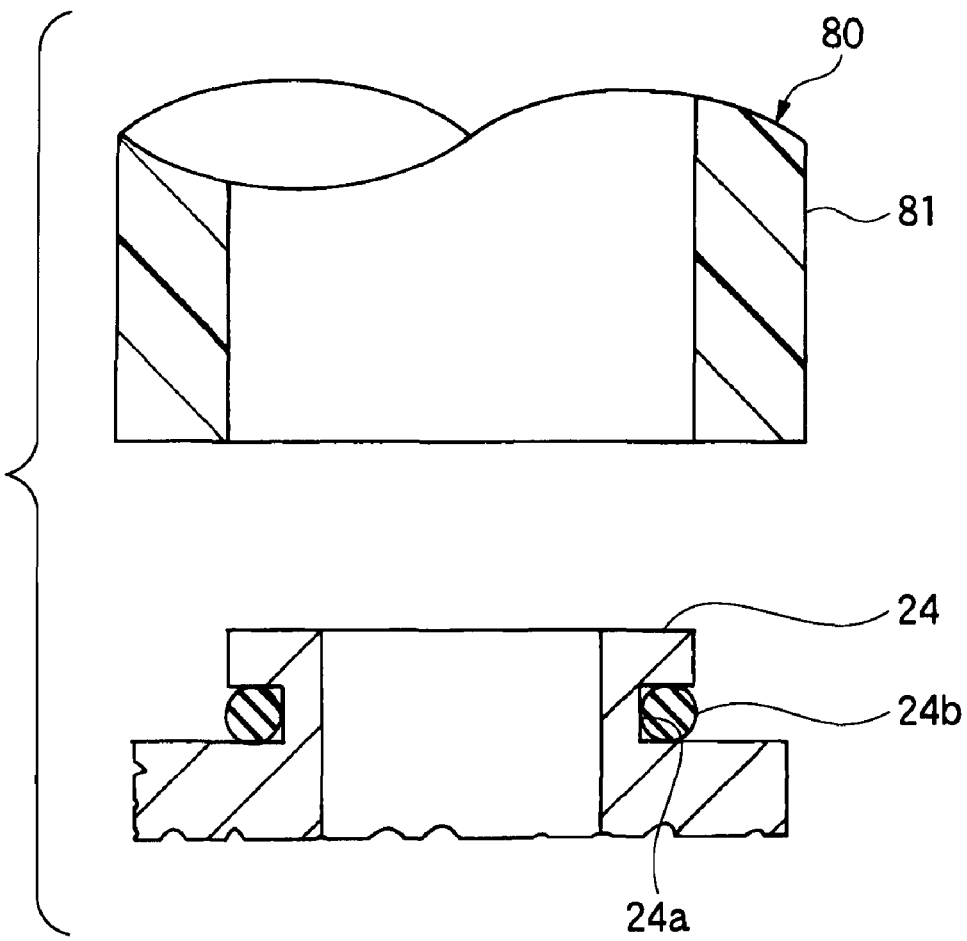
FIG. 9 is an enlarged sectional view of a main part which illustrates a first modified example to a mounting construction of the gas exhaust member shown in FIG. 2.
Figure 10:
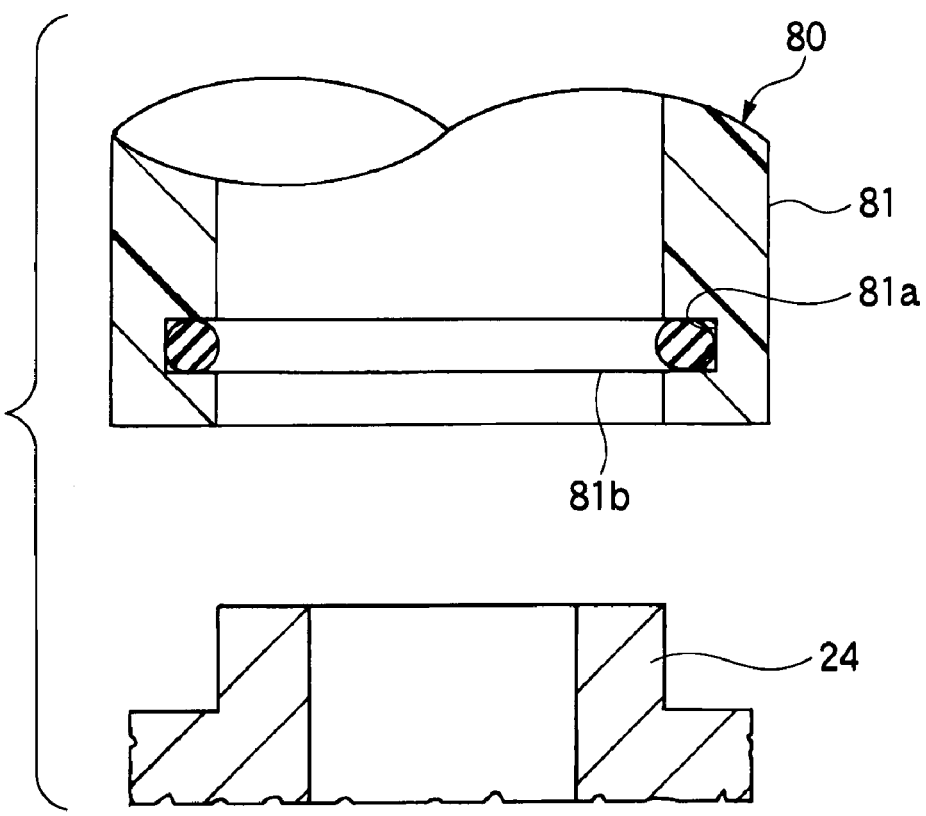
FIG. 10 is an enlarged sectional view of a main part which illustrates a second modified example to the mounting construction of the gas exhaust member shown in FIG. 2.
Figure 11:
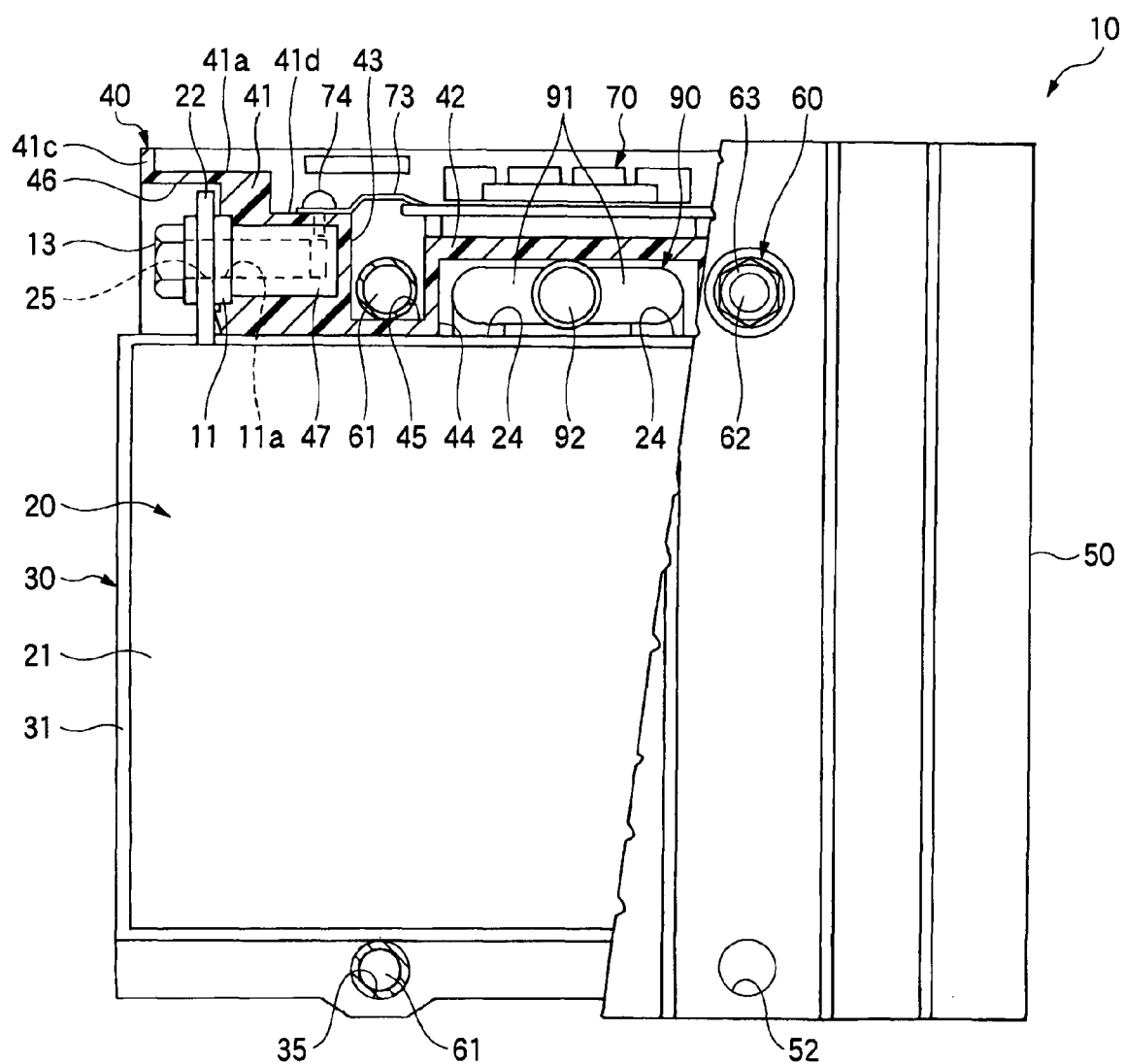
FIG. 11 is a partially cutaway front view which illustrates a first modified example of a gas exhaust member.
Figure 12:
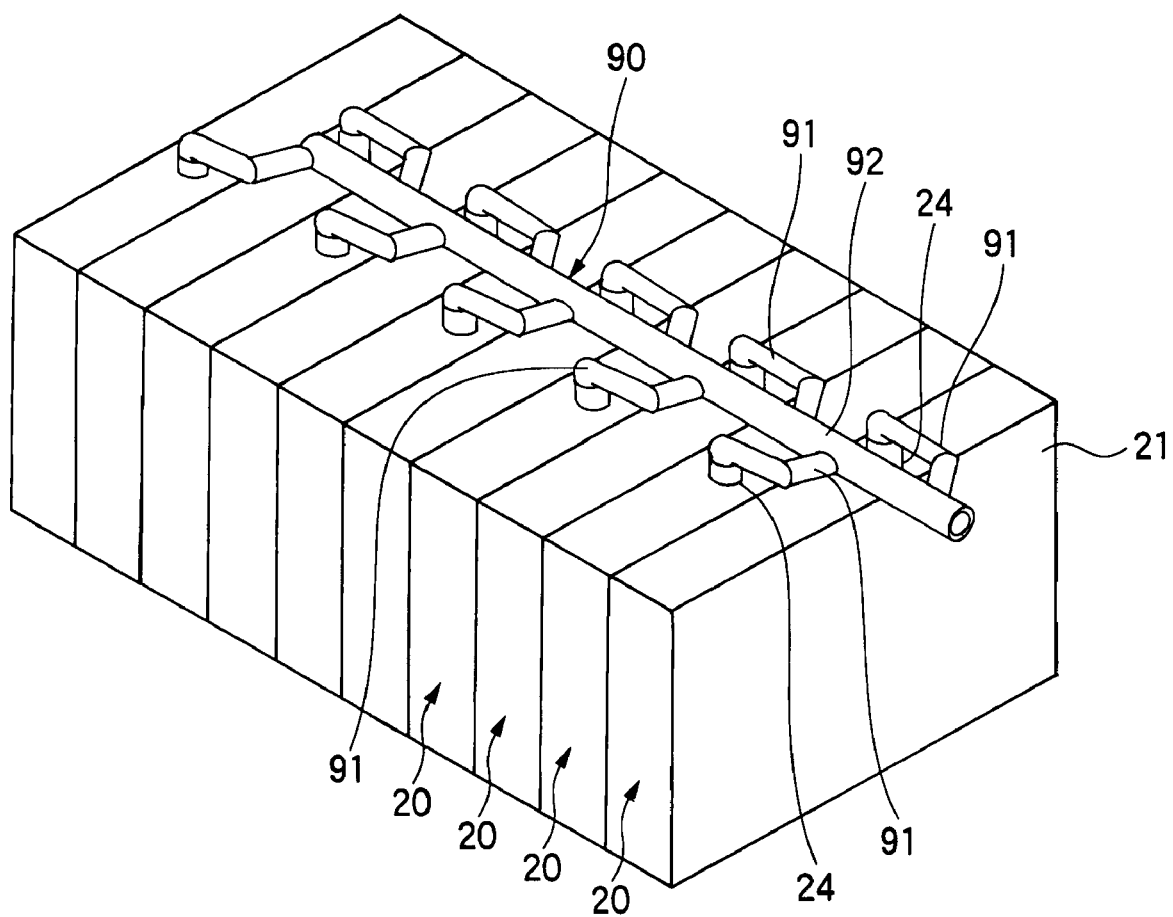
FIG. 12 is a schematic perspective view of the electric rechargeable cells and the gas exhaust member shown in FIG. 11.
Figure 13:
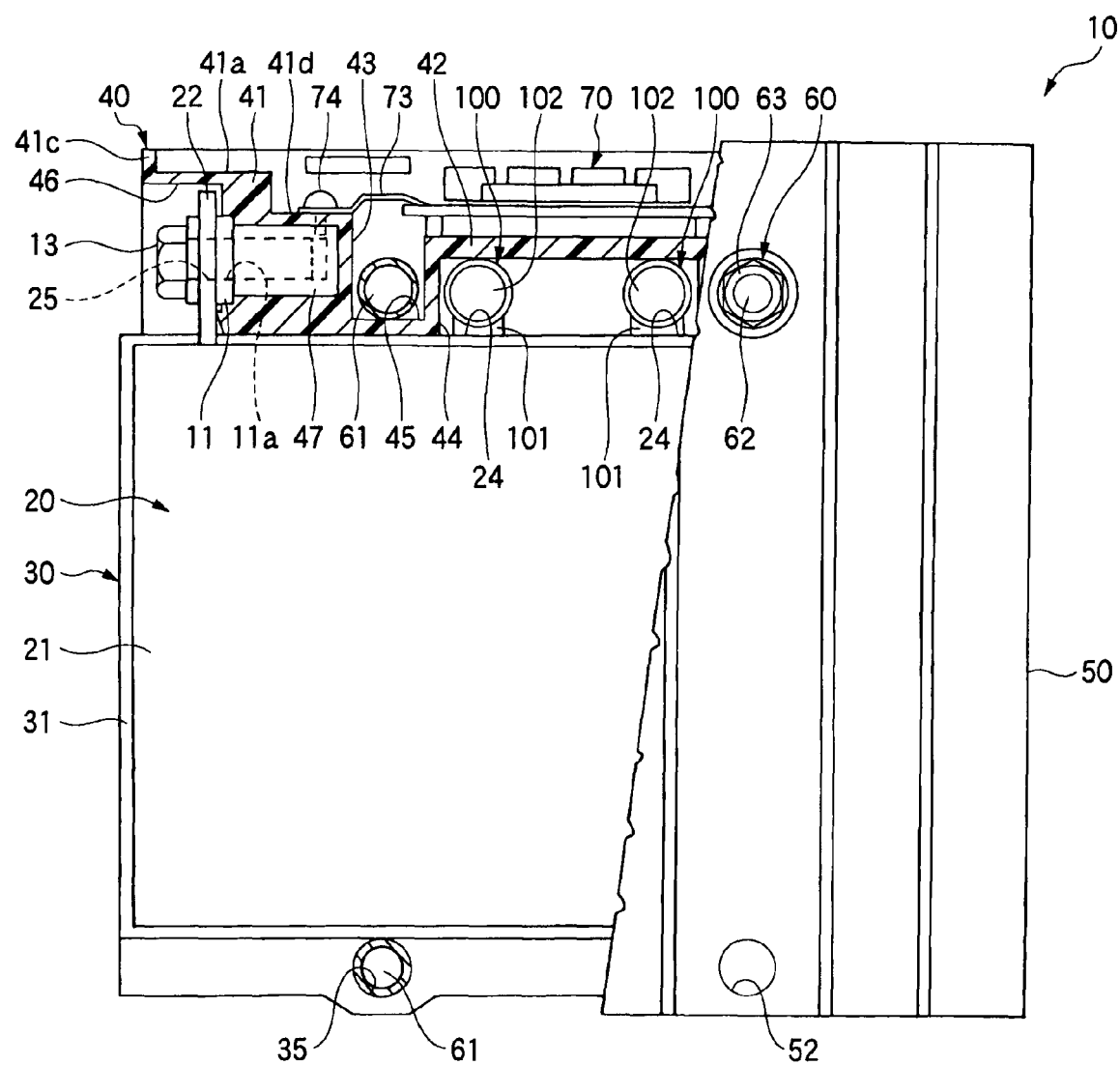
FIG. 13 is a partially cutaway front view which illustrates a second modified example of a gas exhaust member.
Figure 14:
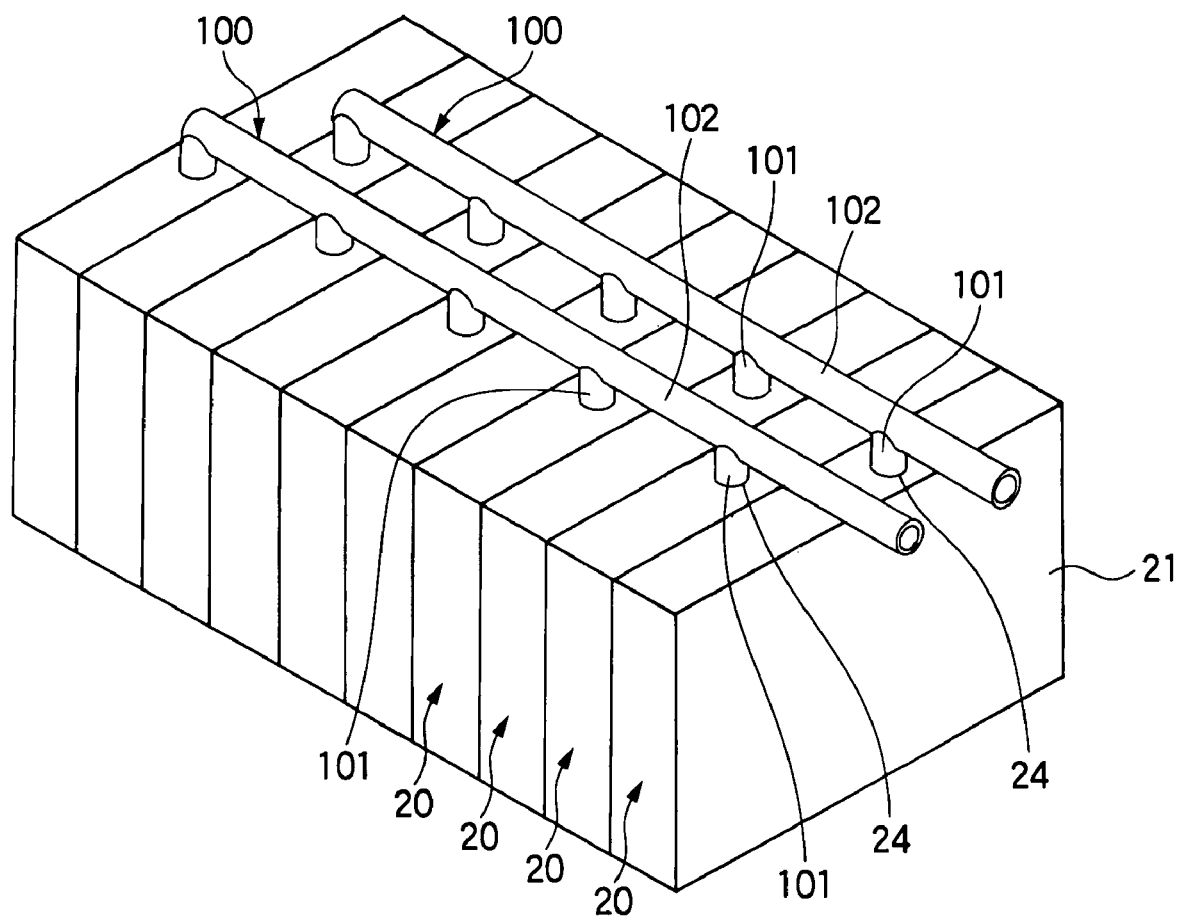
FIG. 14 is a schematic perspective view of electric rechargeable cells and the exhaust member shown in FIG. 13.
Figure 15:
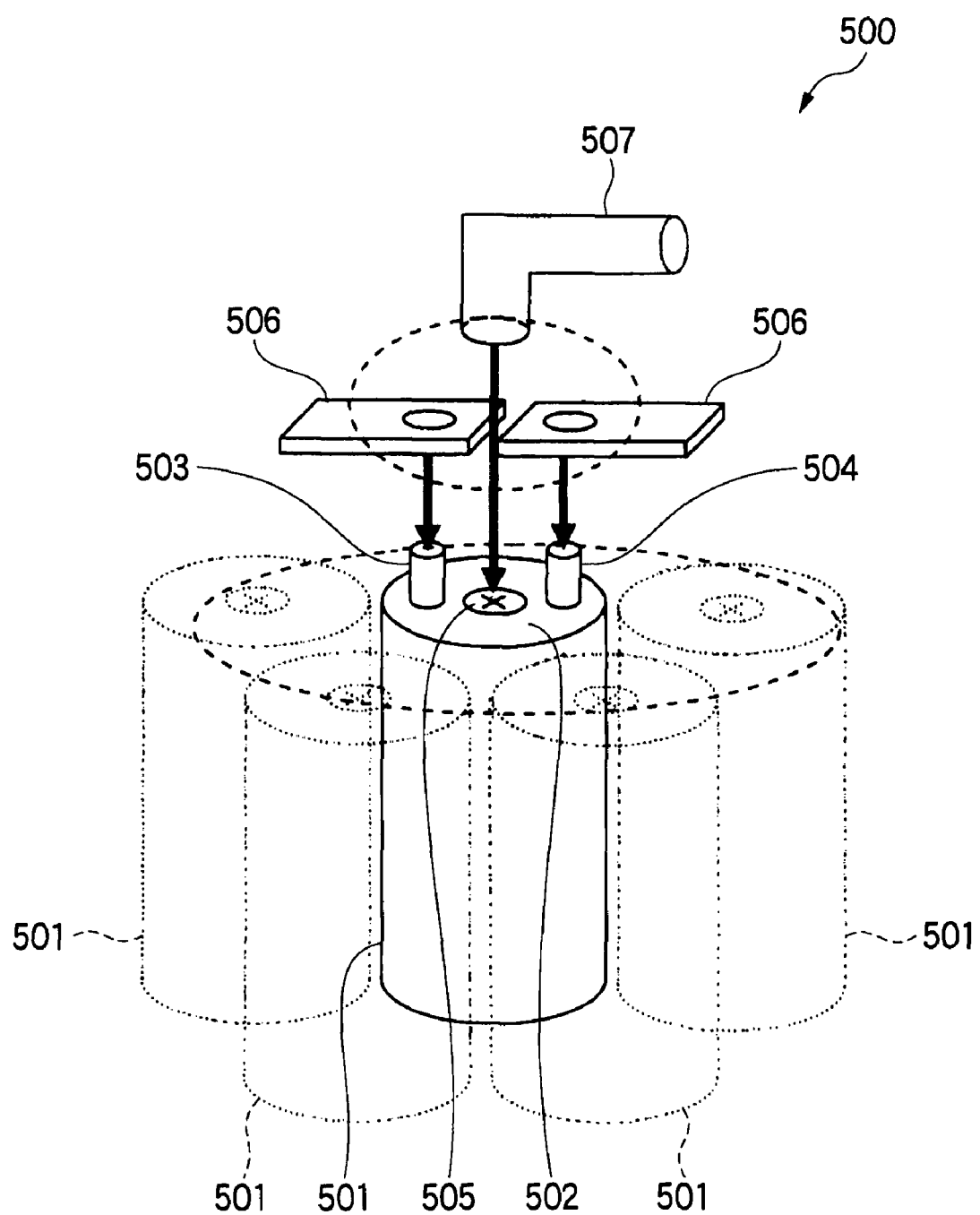
FIG. 15 is a schematic view of a related-art battery system.
Figure 16:
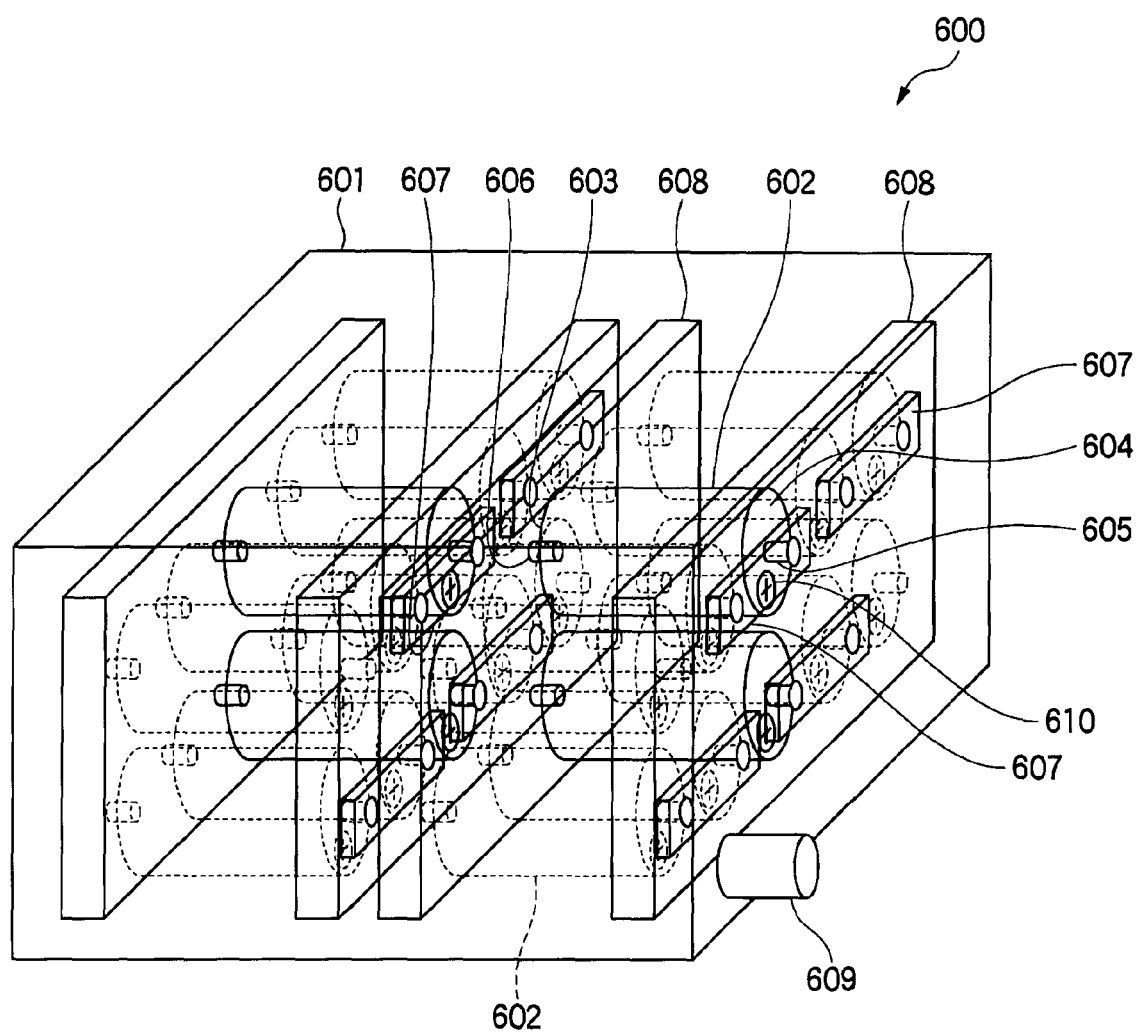
FIG. 16 is a schematic view of another related-art battery system.
Figure 17:
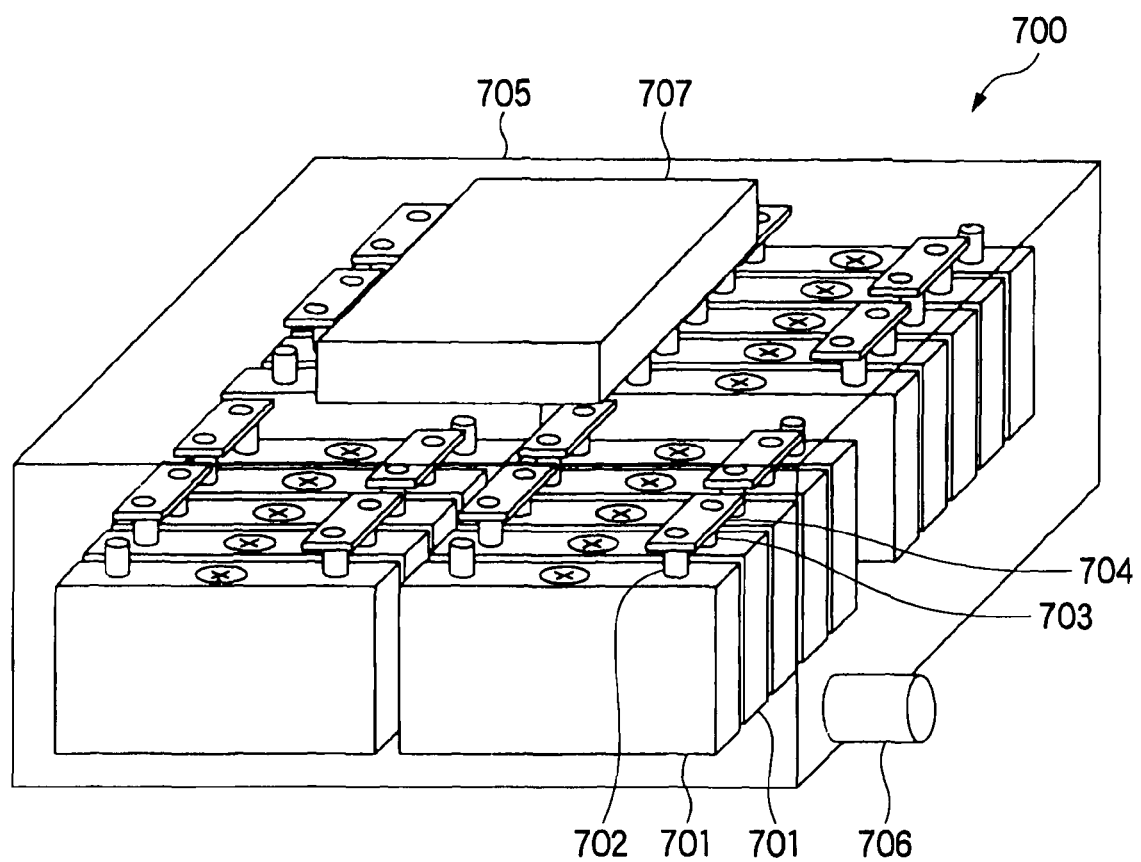
FIG. 17 is a schematic view of a further related-art battery system.

FIG. 1 is a partially cutaway, exploded perspective view which illustrates one embodiment of a battery system according to the invention, FIG. 2 is a partially cutaway front view of the battery system shown in FIG. 1, FIG. 3 is a partially cutaway side view of the battery system shown in FIG. 1, FIG. 4 is a partially cutaway side view which illustrates modified examples of terminals of the electric rechargeable cells, FIG. 5 is a partially cutaway front view which illustrates a modified example of an assembling construction of a conductive member and a partition holding member, FIG. 6 is a sectional view of a main part which illustrates an assembling construction of a through-hole fastening member, FIG. 7 is a sectional view which illustrates a modified example to the assembling construction of the through-hole fastening member shown in FIG. 6, FIG. 8 is a schematic perspective view of electric rechargeable cells and a gas exhaust member shown in FIG. 2, FIG. 9 is an enlarged sectional view of a main part which illustrates a first modified example to a mounting construction of the gas exhaust member shown in FIG. 2, FIG. 10 is an enlarged sectional view of a main part which illustrates a second modified example to the mounting construction of the gas exhaust member shown in FIG. 2, FIG. 11 is a partially cutaway front view which illustrates a first modified example of a gas exhaust member, FIG. 12 is a schematic perspective view of the electric rechargeable cells and the gas exhaust member shown in FIG. 11, FIG. 13 is a partially cutaway front view which illustrates a second modified example of a gas exhaust member, and FIG. 14 is a schematic perspective view of electric rechargeable cells and the exhaust member shown in FIG. 13.

As is shown in FIGS. 1 to 3, a battery system 10 of an embodiment of the invention includes mainly a plurality of electric rechargeable cells 20, a plurality of plate-shaped conductive members 11, a cell holder 30, a partition holding member 40, end face plates 50, through-hole fastening members 60, a lid portion 12, a voltage control circuit 70, and a gas exhaust member 80. The plurality of plate-shaped conductive members 11 electrically connect the plurality of electric rechargeable cells 20. The cell holder 30 holds the plurality of electric rechargeable cells 20. The partition holding member 40 is provided in such a manner as to cover upper surfaces of the cell holder 30. The end face plates 50 are attached, respectively, to front and rear end faces of the cell holder 30 and the partition holding member 40. The through-hole fastening members 60 fasten the cell holder 30, the partition holding member 40 and the end face plates 50 integrally. The lid portion 12 closes an upper opening of the partition holding member 40. The voltage control circuit 70 is attached to the partition holding member 40. The gas exhaust member 80 is connected to the plurality of electric rechargeable cells 20.

The electric rechargeable cell 20 is an angular lithium ion secondary battery. The electric rechargeable cell 20 includes, as is shown in FIGS. 2 and 3, a battery main body 21, a positive electrode terminal 22, a negative electrode terminal 23, and a gas exhaust port 24. The positive electrode terminal 22 and the negative electrode terminal 23 are provided on an upper surface of the battery main body 21 at longitudinal end portions thereof in such a manner as to project therefrom. The gas exhaust port 24 is provided at a central portion of the upper surface of the battery main body 21 through which gas produced within the electric rechargeable cell 20 is exhausted or expelled. In addition, the plurality of electric rechargeable cells 20 are arranged alternately in opposite orientations in such a manner that the positive electrode terminals 22 and the negative electrode terminals 23 of the adjacent electric rechargeable cells 20 are staggered to be located alternately in opposite positions. The positive electrode terminal 22 of the electric rechargeable cell 20 and the negative electrode terminal 23 of the adjacent electric rechargeable cell 20 are electrically connected in series by the conductive member 11.

In addition, the positive electrode terminal 22 and the negative electrode terminal 23 are each a plate-shaped member, and the positive electrode terminal 22 and the negative electrode terminal 23 are disposed in such a manner that plate surfaces thereof confront each other. Additionally, a round hole shaped first penetrating hole 25 is formed in each of the positive electrode terminal 22 and the negative electrode terminal 23. A round hole shaped second penetrating hole 11a is formed in each end portion of the conductive member 11. Fastening bolts 13 are inserted in the first penetrating holes 25 of the respective terminals 22, 23 and the second penetrating holes 11a of the conductive member 11. By the fastening bolts 13 being fastened by nut members 47 of the partition holding member 40, which will be described later, the respective terminals 22, 23 and the conductive member 11 are electrically connected.

In addition, as modified examples of a positive electrode terminal 22 and a negative electrode terminal 23 of the embodiment, as is shown in FIG. 4, elongated first penetrating holes 25a may be formed in a positive electrode terminal 22 and a negative electrode terminal 23. By this configuration, since the conductive members 11 can be arranged in a zigzag fashion in such a manner as to be offset vertically along a direction in which the electric rechargeable cells 20 are stacked, a thicker fastening bolt 13 is allowed to be used.

As is shown in FIGS. 2 and 3, the cell holder 30 is made by connecting a plurality of synthetic resin holder main bodies 31 in the direction in which the electric rechargeable cells 20 are stacked, so that the electric rechargeable cell 20 is held between the holder main bodies 31. The holder main body 31 has a separation or dividing plate portion 32 which is disposed between the electric rechargeable cells 20 and projecting portions 33 which are formed, respectively, at upper and lower end portions of the dividing plate portion 32 for holding upper and lower end corner portions of the electric rechargeable cell 20. In addition, by the electric rechargeable cells 20 being held by the projecting portions 33, gaps 34 along which cooling air is caused to flow are formed between the electric rechargeable cells 20 and the cell holder 30. In addition, the projecting portions 33 may be provided at mid portions of the dividing plate portions 32. In addition, fastening member inserting portions 35, 35 through which the through-hole fastening members 60 are inserted so as to extend are formed in a lower end portion of the cell holder 30 along the direction in which the electric rechargeable cells 20 are stacked.

The partition holding member 40 is made up of an insulating member which is made from synthetic resin. The partition holding member 40 has, as is shown in FIGS. 2 and 3, a pair of left and right side bodies 41, and an alternately grooved and ridged plate portion 42. The alternately grooved and ridged plate portion 42 is formed between the pair of left and right side bodies 41. On an upper surface of the alternately grooved and ridged plate portion 42, the voltage control circuit 70 is mounted. The partition holding member 40 establishes partitions between the gas exhaust member 80 and the positive electrode terminals 22 and the negative electrode terminals 23 in such a manner as to cover the gas exhaust member 80 and the positive electrode terminals 22 and the negative electrode terminals 23. The conductive members 11 are provided on the partition holding member 40.

In the alternately grooved and ridged plate portion 42, a circuit accommodating portion 43, and a gas exhaust member accommodating portion 44. The circuit accommodating portion accommodates the voltage control circuit 70 between the upper surface thereof and the lid portion 12. The gas exhaust member accommodating portion 44 accommodates the gas exhaust member 80 between a lower surface thereof and the cell holder 30. Furthermore, fastening member inserting portions 45, 45 through which the through-hole fastening members 60 are inserted so as to extend are formed between both side surfaces of the alternately grooved and ridged plate portion 42 and the pair of left and right side bodies 41 of the partition holding member 40. By this configuration, since the partition holding member 40 is made to have a layered construction, the voltage control circuit 70 and the gas exhaust member 80 are incorporated in the partition holding member 40 in a compact fashion.

In addition, a plurality (a number equal to the number of electric rechargeable cells 20) of terminal accommodating portions 46 for accommodating therein the respective terminals 22, 23 of the electric rechargeable cells 20 are formed on a side surface portion of each of the side bodies 41 in the direction in which the electric rechargeable cells 20 are stacked.

In addition, nut members 47 into which the fastening bolt 13 is screwed to be fixed in place are embedded in the terminal accommodating portions 46 of the side bodies 41 in positions which confront to the first penetrating holes 25 of the terminals 22, 23 of the electric rechargeable cells 20.

Additionally, screw holes 41b are formed in a plurality of locations on an upper step portion 41a of each of the side bodies 41 in the direction in which the electric rechargeable cells 20 are stacked. By lid portion fixing screws 12a being screwed into the screw holes 41b via the lid portion 12, the lid portion 12 is attached to the upper surface of the partition holding member 40. In addition, an edge portion 41c for positioning the lid portion 12 in a width direction is formed along an outer side edge portion of each of the upper step portions 41a.

In addition, as is shown in FIG. 3, rotation preventive projections 48 are formed within each terminal accommodating portion 46 of each side body 41 in positions which confront each other diagonally across the terminal 22 or 23. The rotation preventive projections 48 are disposed in such a manner as to be brought into abutment with outer circumferential edge portions of each terminal 22 or 23 which are positioned to confront each other diagonally. The rotation preventive projections 48 function to prevent the application of load to the terminal 22 or 23 which causes the terminal 22 or 23 to rotate together with the fastening bolt 13 when the fastening bolt 13 is screwed into the nut member 47.

Additionally, as a modified example of an assembling construction of the conductive members 11 and the partition holding member 40, a construction as is shown in FIG. 5 may be adopted when the respective terminals 22, 23 are made of a material such as copper or aluminum which is relatively low in strength in which the conductive members 11 are disposed on a fastening bolt 13 side of the terminals 22, 23. By adopting this construction, since the fastening bolts 13 are allowed to contact the conductive members 11 which are thick and high in strength but are prevented from contacting the terminals 22, 23 which are thin and low in strength, a risk that the terminals 22, 23 may be damaged by the fastening bolts 13 can be avoided. In addition, as this occurs, a loose-fit hook 49 which supports the conductive member 11 in a floating state is provided within each terminal accommodating portion 46 of the partition holding member 40 so as to increase the assembling properties of the conductive member 11 to the partition holding member 40. In addition, a hold spring mechanism, not shown, may be provided on the partition holding member 40 so as to prevent the loosening of the conductive member 11 to thereby increase the assembling properties.

As is shown in FIGS. 1 to 3, the end face plate 50 is made by laminating two plate members made from synthetic resin one on the other. The end face plate 50 has one gas exhaust member inserting hole 51 which allows the gas exhaust member to extend therethrough, and four fastening member inserting holes 52 which allows the through-hole fastening members 60 to extend therethrough. In addition, the end face plates 50 are attached to the cell holder 30 and the partition holding member 40 in such a manner as to hold front and rear end faces thereof therebetween by the through-hole fastening members 60.

As is shown in FIGS. 1 to 3, the through-hole fastening members 60 have cylindrical portions 61, stud bolts 62, and fastening nuts 63. The cylindrical portions 61 are inserted to extend through the fastening member inserting portions 35, 35 of the cell holder 30 and the fastening member inserting holes 52, 52 formed on a lower side of the end face plates 50. The cylindrical portions 61 are inserted to extend through the fastening member inserting portions 45, 45 of the partition holding member 40 and the fastening member inserting holes 52, 52 formed on an upper side of the end face plates 50. The stud bolts 62 are inserted to extend through the cylindrical portions 61. The fastening nuts 63 are screwed, respectively, on to screw portions formed on both end portions of the stud bolts 62. By this configuration, the cell holder 30, the partition holding member 40 and the end face plates 50, 50 are fastened integrally, resulting in a strong and rigid housing construction as a whole.

In addition, as is shown in FIG. 6, the cylindrical portion 63 is supported tightly by a plurality of guide portions 45a. The plurality of guide portions 45a are formed in a zigzag fashion in the direction in which the electric rechargeable cells 20 are stacked in an interior of the fastening member inserting portion 45, and have an inside diameter which is slightly larger than an outside diameter of the cylindrical portion 61.

In addition, as an modified example of an assembling construction of the cylindrical portions 61, as is shown in FIG. 7, the cylindrical portion 61 is inserted in fastening member inserting portion 45 with a predetermined gap existing between the guide portions 45b and the cylindrical portion 61 and is supported loosely by elastic pieces 45c provided on the plurality of guide portions 45b. The plurality of guide portions 45b are formed in a zigzag fashion in the direction in which the electric rechargeable cells 20 are stacked in an interior of the fastening member inserting portion 45 and have a inside diameter larger than the outside diameter of the cylindrical portion 61.

As is shown in FIG. 1, the voltage control circuit 70 includes a circuit board 71, various types of electronic devices 72 such as pluralities of integrated circuits, resistances and capacitors, and connecting wires 73. The electronic devices 72 are packaged on the circuit board 71. The number of connecting wires 73 corresponds to the number of electric rechargeable cells 20, and the connecting wires 73 are provided on side edge portions of the circuit board 71. The connecting wire 73 is fastened to a lower step portion 41d of the side body 41 and the nut member 47 by a connecting wire fixing screw 74, so as to be electrically connected to the nut member 47. By this configuration, the voltage control circuit 70 is electrically connected to the positive electrode terminals 22 and the negative electrode terminals 23 of the electric rechargeable cells 20 through the connecting wires 73 and the nut members 47. Therefore, not only the charged capacities of the individual electric rechargeable cells 20 can be monitored but also charging and discharging thereof can be controlled so that the charged capacities of the individual electric rechargeable cells 20 become uniform. In addition, in this embodiment, the voltage control circuit 70 is provided between the positive electrode terminals 22 and the negative electrode terminals 23 of the electric rechargeable cells 20.

As is shown in FIGS. 2 and 8, the gas exhaust member 80 has a plurality of dividing pipes 81, two exhaust pipes 82, 82, and a collecting pipe 83. The plurality of dividing pipes 81 are connected, respectively, to the gas exhaust ports 24 which are disposed in a row in the direction in which the electric rechargeable cells 20 are stacked. The plurality of dividing pipes 81 are each formed to have a V-shape as viewed from the top. The two exhaust pipes 82, 82 are connected, respectively, to end portions of the plurality of dividing pipes 81. The collecting pipe 83 is connected to one ends of the exhaust pipes 82, 82 in such a manner that the exhaust pipes 82, 82 are collected thereinto. A leading end portion of the collecting pipe 83 is led to the outside from the gas exhaust member inserting hole 51 formed in the end face plate 50.

In addition, the gas exhaust member 80 is disposed in such a manner as to be brought into contact with a lower surface of the alternately grooved and ridged plate portion 42 of the partition holding member 40 at an upper surface thereof. Therefore, the gas exhaust member 80 is fixed to the gas exhaust ports 24 in such a way as to be pressed downwards by the partition holding member 40. By this configuration, the gas exhaust member 80 can be prevented from being dislocated from the gas exhaust ports 24 due to a pressure under which exhaust gas is expelled from the gas exhaust ports 24.

In addition, in case the gas exhaust member 80 is made from rubber, by the dividing pipes 81 being fitted in the corresponding gas exhaust ports 24, airtightness can easily be ensured between the electric rechargeable cells 20 and the gas exhaust member 80.

Additionally, as a first modified example of a mounting construction of the gas exhaust member 80 according to the embodiment, as is shown in FIG. 9, a configuration may be adopted in which the gas exhaust member 80 is made from synthetic resin, a recessed groove 24a is formed on an outer circumferential surface of the gas exhaust port 24 of the electric rechargeable cell 20, and a ring-shaped seal member 24b is mounted in the recessed groove 24a. Because of this configuration, by the dividing pipes 81 being fitted in the corresponding gas exhaust ports 24, airtightness between the electric rechargeable cells 20 and the gas exhaust member 80 can be ensured further.

In addition, as a second modified example of a mounting construction of the gas exhaust member 80 according to the embodiment, as is shown in FIG. 10, a configuration may be adopted in which the gas exhaust member 80 is made from synthetic resin, a recessed groove 81a is formed on an inner circumferential surface of the dividing pipe 81 of the gas exhaust member 80, and a ring-shaped seal member 81b is mounted in the recessed groove 81a. Because of this configuration, by the dividing pipes 81 being fitted in the corresponding gas exhaust ports 24, airtightness between the electric rechargeable cells 20 and the gas exhaust member 80 can be ensured further.

Next, referring to FIGS. 11 and 12, a gas exhaust member 90 will be described which is a first modified example made to the gas exhaust member 80 of the embodiment.

A gas exhaust member 90 of this modified example has a plurality of branch pipes 91 and one exhaust pipe 92. The plurality of branch pipes 91 are connected, respectively, to gas exhaust ports 24 which are disposed in a zigzag fashion in the direction in which the electric rechargeable cells 20 are stacked. The plurality of branch pipes 91 are connected to the exhaust pipe 92 in such a manner as to be collected thereinto. A leading end portion of the exhaust pipe 92 is led to the outside of the battery system from the gas exhaust member inserting hole 51 formed in the end face plate 50.

Next, referring to FIGS. 13 and 14, a gas exhaust member 100 will be described which is a second modified example made to the gas exhaust member 80 of the embodiment.

A gas exhaust member 100 of this modified example has a plurality of conduits 101 and two independent exhaust pipes 102, 102. The plurality of conduits 101 are connected, respectively, to gas exhaust ports 24 which are disposed in a zigzag fashion in the direction in which the electric rechargeable cells 20 are stacked. The plurality of conduits 101 which are arranged in two rows are connected to two independent exhaust pipes 102, 102, respectively. In addition, in this modified example, in order for the two exhaust pipes 102, 102 to be led to the outside of the battery system, two gas exhaust portion inserting holes 51 are formed in the end face plate 50.

Thus, as has been described heretofore, according to the battery system 10 of the embodiment, the battery system 10 includes the electric rechargeable cells 20 which each have the gas exhaust port 24, as well as the positive electrode terminal 22 and the negative electrode terminal 23 which are disposed in such a manner as to hold the gas exhaust port 24 therebetween. The battery system 10 also includes the gas exhaust member 80 which is connected to the gas exhaust ports 24 and the voltage control circuit 70 which is provided in the position confronting the gas exhaust member 80 and between the positive electrode terminals 22 and the negative electrode terminals 23 and is connected to the positive electrode terminals 22 and the negative electrode terminals 23 of the electric rechargeable cells 20 so as to control the voltages of the individual electric rechargeable cells 20. Therefore, the positive electrode terminals 22 and the negative electrode terminals 23 of the electric rechargeable cells 20 and the voltage control circuit 70 can be connected to each other over a short distance, thereby making it possible to miniaturize the battery system 10.

In addition, according to the battery system 10 of the embodiment, the battery system 10 includes the electric rechargeable cells 20 which each have the gas exhaust port 24, as well as the positive electrode terminal 22 and the negative electrode terminal 23 which are disposed in such a manner as to hold the gas exhaust port 24 therebetween. The battery system 10 also includes the gas exhaust member 80 which is connected to the gas exhaust ports 24, the partition holding member 40 which establishes the partitions between the gas exhaust member 80 and the positive electrode terminals 22 and the negative electrode terminals 23 in such a manner as to cover the gas exhaust member 80 and the positive electrode terminals 22 and the negative electrode terminals 23 and on which the conductive members 11 are provided and the voltage control circuit 70 attached to the outer surface side of the partition holding member 40 in the position which confronts the gas exhaust member 80 for controlling the voltages of the individual electric rechargeable cells 20. Therefore, not only the space defined between the positive electrode terminals 22 and the negative electrode terminals 23 is used effectively but also the partition holding member 40 has the layered construction. Thus, the electric rechargeable cells 20, the respective terminals 22, 23 of the electric rechargeable cells 20, the conductive members 11, the voltage control circuit 70 and the gas exhaust member 80 can be integrated into a compact unit. In addition, since the voltage control circuit 70 is incorporated within the battery system 10, the assembling properties of the battery system 10 can be increased, thereby making it possible to realize the miniaturization of the battery system 10.

In addition, according to the battery system 10 of the embodiment, the positive electrode terminals 22 and the negative electrode terminals 23 are both the plate-shaped members and are disposed in such a manner that the plate surfaces thereof confront each other. Therefore, torque received by the electric rechargeable cells 20 when the conductive members 11 are connected to the electric rechargeable cells 20 in such a manner as to expand between the adjacent electric rechargeable cells 20 can be made to be borne by the nut members 47 of the partition holding member 40 when compared with a battery system in which terminals of electric rechargeable cells each have a round shaft shape. Thus, the electric rechargeable cell can be made compact in terms of strength, thereby making it possible to realize the miniaturization of the battery system.

Additionally, according to the battery system 10 of the embodiment, the first penetrating holes 25 are formed respectively in the positive electrode terminals 22 and the negative electrode terminals 23 and the second penetrating holes 11a are provided respectively at both the end portions of the conductive members 11 so that the positive electrode terminals 22. The negative electrode terminals 23 and the conductive members 11 are fixed together by the fastening bolts 13 which are inserted into the first penetrating holes 25 and the second penetrating holes 11a. Therefore, the conductive members 11 can easily be fastened to the positive electrode terminals 22 and the negative electrode terminals 23.

In addition, according to the battery system 10 of the embodiment, the first penetrating holes 25 of the positive electrode terminals 22 and the negative electrode terminals 23 are formed into the elongated hole shape. By the adjacent conductive members 11 being arranged in a zigzag fashion in the direction in which the electric rechargeable cells 20 are stacked, a larger bolt can be used, thereby making it possible to increase the assembling properties of the battery system 10.

Additionally, according to the battery system 10 of the embodiment, the cell holder 30 for holding the electric rechargeable cells 20 is provided and the projecting portions are formed on the cell holder 30 for forming the gaps 34 between the electric rechargeable cells 20 and the cell holder 30 through which cooling air is caused to flow. Therefore, the electric rechargeable cells 20 can be cooled with good efficiency.

In addition, according to the battery system 10 of the embodiment, the nut members 47 which are conductive and into which the fastening bolts 13 are screwed are provided and the nut members 47 and the voltage control circuit 70 are electrically connected. Therefore, the positive electrode terminals 22 and the negative electrode terminals 23 of the electric rechargeable cells 20 and the voltage control circuit 70 can be connected to each other over a short distance, thereby making it possible to reduce the possibility that a problem such as short circuit occurs.

Additionally, according to the battery system 10 of the embodiment, the gas exhaust ports 24 are disposed in a row in the direction in which the electric rechargeable cells 20 are stacked and the gas exhaust member 80 is formed such that gases from the gas exhaust ports 24 are divided so as to flow into the two exhaust pipes 82 via the plurality of dividing pipes 81. Therefore, even in the event that gases are produced within the electric rechargeable cells 20, the pressure under which the gases are produced can be dispersed through the two divided exhaust pipes 82 into which the gases so produced are designed to be divided to flow, thereby making it possible to expel the gases so produced to the outside of the battery system 10 with good efficiency.

In addition, according to the battery system 10 of the embodiment, the gas exhaust ports 24 are disposed in the zigzag fashion in the direction in which the electric rechargeable cells 20 are stacked and the gas exhaust member 90 is formed such that gases from the gas exhaust ports 24 are collected into the one exhaust pipe 92. Therefore, even in the event that gases are produced within the electric rechargeable cells 20, the pressure under which the gases are produced can be dispersed through the exhaust pipe 92 into which the gases so produced are designed to be collected to flow, thereby making it possible to expel the gases so produced to the outside of the battery system 10 with good efficiency.

Additionally, according to the battery system 10 of the embodiment, the gas exhaust ports 24 are disposed in the plurality of rows in the direction in which the electric rechargeable cells 20 are stacked and the gas exhaust member 100 is formed such that gases from the gas exhaust ports 24 of the plurality of rows are designed to be collected by the row to flow into the exhaust pipes 102 which are disposed correspondingly to the respective rows of gas exhaust ports 24. Therefore, even in the event that gases are produced within the electric rechargeable cells 20, the pressure under which the gases are produced can be dispersed through the exhaust pipes 102 which are disposed correspondingly to the respective rows, thereby making it possible to expel the gases so produced to the outside of the battery system 10 with good efficiency.

Furthermore, according to the battery system 10 of the embodiment, there are provided the end face plates 50 which are attached, respectively, to the end faces of the cell holder 30 and the partition holding member 40 and the through-hole fastening members 60 which extend through the cell holder 30 and the partition holding member 40, as well as the end face plates 50 in such a manner as to fasten the cell holder 30, the partition holding member 40 and the end face plates 50 together. Therefore, the strong and rigid housing can be obtained as the whole of the battery system, thereby making it possible to increase the durability of the battery system 10.

Note that the invention is not limited to the embodiment which has been illustrated heretofore and hence can be altered or modified as required without departing form the spirit and scope of the invention.

For example, while in the embodiment, the partition holding member 40 is made up of the side bodies 41 and the alternately grooved and ridged plate portion 42 which are molded into the integral unit, the invention is not limited thereto. Hence, a partition holding member may be adopted which is made by connecting and combining together a plurality of separately molded constituent members.

What is claimed is:

1. A battery system, comprising:
   a plurality of electric rechargeable cells which are stacked in a row, the electric rechargeable cells each having a gas exhaust port, a positive electrode terminal and a negative electrode terminal, the positive and negative electrode terminals being disposed on upper surfaces of the plurality of electric rechargeable cells such that the gas exhaust port is disposed therebetween;
   a gas exhaust member connected to the gas exhaust ports;
   a partition holding member which establishes partitions between the gas exhaust member and the positive electrode terminals and the negative electrode terminals in such a manner as to cover the gas exhaust member and the positive electrode terminals and the negative electrode terminals;
   conductive members which electrically connect the electric rechargeable cells together, the conductive member being provided on the partition holding member; and
   a voltage control circuit which controls voltages of the electric rechargeable cells, the voltage control circuit being attached to an outer surface side of the partition holding member in a position which confronts the gas exhaust member.

2. A battery system as set forth in claim 1, wherein the positive electrode terminals and the negative electrode terminals are each a plate-shaped member and are disposed in such a manner that plate surfaces thereof confront each other.

3. A battery system as set forth in claim 1, wherein a first penetrating hole is provided in each of the positive electrode terminals and each of the negative electrode terminals and a second penetrating hole is provided in each end portion of each of the conductive members, and wherein the positive electrode terminal, the negative electrode terminal and the conductive member are fixed together by fastening members which are inserted into the first penetrating holes and the second penetrating holes.

4. A battery system as set forth in claim 3, wherein the first penetrating hole is formed into an elongated hole shape, and the adjacent conductive members are arranged in a zigzag fashion in a direction of the row of electric rechargeable cells so as to be connected to the positive electrode terminals and the negative electrode terminals.

5. A battery system as set forth in claim 1, further comprising:
a cell holder which holds the electric rechargeable cells, the cell holder having projecting portions which define gaps between the electric rechargeable cells and the cell holder along which cooling air is caused to flow.

6. A battery system as set forth in claim 3, further comprising:
a threaded fastener member which is conductive and into which the fastening member is screwed,
wherein the threaded fastener member and the voltage control circuit are electrically connected.

7. A battery system as set forth in claim 1, wherein
the gas exhaust ports are disposed in a row in a direction in which the electric rechargeable cells are stacked, and
the gas exhaust member has a plurality of exhaust pipes and gases from the gas exhaust ports are divided so as to flow into the plurality of exhaust pipes.

8. A battery system as set forth in claim 1, wherein
the gas exhaust ports are disposed in a zigzag fashion in a direction in which the electric rechargeable cells are stacked, and
the gas exhaust member has a single exhaust pipe and gases from the gas exhaust ports are collected so as to flow into the single exhaust pipe.

9. A battery system as set forth in claim 1, wherein
the gas exhaust ports are disposed in a plurality of rows in a direction in which the electric rechargeable cells are stacked, and
the gas exhaust member has exhaust pipes which are disposed correspondingly to the respective rows of exhaust ports, and gases from the gas exhaust ports disposed in the plurality of rows are collected into the exhaust pipes.

10. A battery system as set forth in claim 5, further comprising:
end face plates which are attached, respectively, to end faces of the cell holder and the partition holding member; and
a through-hole fastening member which extends through the cell holder, the partition holding member and the end face plates so as to fasten together the cell holder, the partition holding member and the end face plates.

* * * * *